US010658689B2

(12) United States Patent
Mitchell et al.

(10) Patent No.: US 10,658,689 B2
(45) Date of Patent: May 19, 2020

(54) AUTHENTICATION OF REPLACEABLE FUEL CARTRIDGE

(71) Applicant: INTELLIGENT ENERGY LIMITED, Loughborough (GB)

(72) Inventors: Philip Mitchell, Loughborough (GB); Anand Chellappa, Long Beach, CA (US)

(73) Assignee: INTELLIGENT ENERGY LIMITED, Loughborough, Leicestershire (GB)

( * ) Notice: Subject to any disclaimer, the term of this patent is extended or adjusted under 35 U.S.C. 154(b) by 955 days.

(21) Appl. No.: 14/380,678

(22) PCT Filed: Jan. 18, 2013

(86) PCT No.: PCT/US2013/022117
§ 371 (c)(1),
(2) Date: Aug. 22, 2014

(87) PCT Pub. No.: WO2013/112368
PCT Pub. Date: Aug. 1, 2013

(65) Prior Publication Data
US 2015/0041354 A1 Feb. 12, 2015

Related U.S. Application Data

(60) Provisional application No. 61/590,688, filed on Jan. 25, 2012.

(51) Int. Cl.
*G06F 21/44* (2013.01)
*H01M 8/04082* (2016.01)
*G09F 3/00* (2006.01)

(52) U.S. Cl.
CPC ........ *H01M 8/04208* (2013.01); *G06F 21/44* (2013.01); *B65D 2101/0023* (2013.01);
(Continued)

(58) Field of Classification Search
CPC ...... G06F 21/44; G09F 3/0291; G09F 3/0292; G09F 3/0297; H01M 8/04208;
(Continued)

(56) References Cited

U.S. PATENT DOCUMENTS

| 6,226,619 B1 | 5/2001 | Halperin et al. |
| 6,267,672 B1 * | 7/2001 | Vance .................... G06Q 30/02 463/29 |

(Continued)

FOREIGN PATENT DOCUMENTS

| CN | 101156022 A | 4/2008 |
| CN | 101431158 A | 5/2009 |

(Continued)

OTHER PUBLICATIONS

English translation of JP-2008236196-A, 7 pages published Oct. 2, 2008 (Year: 2008).*

(Continued)

*Primary Examiner* — James D Nigh
(74) *Attorney, Agent, or Firm* — Baker Hostetler, LLP; Mark H. Krietzman

(57) ABSTRACT

The within disclosure provides devices, methods and systems for use in authenticating hydrogen fuel tanks or cartridges utilizing unique identifier elements, physical conformations and combinations of same. A user may place a hydrogen cartridge with a hollow body and a shaped body and/or dispensing end in a carriage having a fluid communication means and said fluid communication means matching said shaped body and/or dispensing end, whereby a tank mating to the carriage is limited to matching shaped cartridge and carriage.

7 Claims, 6 Drawing Sheets

(52) U.S. Cl.
CPC .... *B65D 2203/06* (2013.01); *F17C 2205/052* (2013.01); *F17C 2205/054* (2013.01); *F17C 2221/012* (2013.01); *F17C 2223/0123* (2013.01); *F17C 2223/035* (2013.01); *F17C 2270/0763* (2013.01); *G09F 3/0291* (2013.01); *G09F 3/0292* (2013.01); *G09F 3/0297* (2013.01); *H01M 2250/30* (2013.01); *Y02B 90/18* (2013.01); *Y02E 60/321* (2013.01); *Y10T 29/49764* (2015.01)

(58) Field of Classification Search
CPC ......... H01M 2250/30; Y10T 29/49764; B65D 2101/0023; B65D 2203/06; F17C 2205/052; F17C 2205/054; F17C 2221/012; F17C 2223/0123; F17C 2223/035; F17C 2270/0763; Y02B 90/18; Y02E 60/321
USPC ........................................................ 705/50
See application file for complete search history.

(56) References Cited

U.S. PATENT DOCUMENTS

| | | | | |
|---|---|---|---|---|
| 6,308,991 B1 * | 10/2001 | Royer | ................... | A63F 3/0665 235/100 |
| 7,645,536 B2 * | 1/2010 | Akiyama | .......... | H01M 8/04208 137/255 |
| 2006/0095778 A1 * | 5/2006 | He | ....................... | G06Q 10/087 713/180 |
| 2008/0129037 A1 * | 6/2008 | Roth | ...................... | G06K 17/00 283/85 |
| 2008/0145612 A1 * | 6/2008 | Church | ................. | G09F 3/0291 428/143 |
| 2009/0001722 A1 * | 1/2009 | Yoshihiro | ............... | F16L 37/23 285/382.2 |
| 2009/0050630 A1 | 2/2009 | Iida et al. | | |
| 2009/0157037 A1 * | 6/2009 | Iyer | ......................... | A61J 1/067 604/403 |
| 2009/0169019 A1 * | 7/2009 | Bauchot | .................. | G06F 21/10 380/278 |
| 2009/0218391 A1 * | 9/2009 | He | ......................... | G06Q 10/06 235/375 |
| 2009/0233150 A1 | 9/2009 | Takahashi et al. | | |
| 2011/0114647 A1 * | 5/2011 | Hallberg | ............ | A47G 19/2227 220/592.17 |

FOREIGN PATENT DOCUMENTS

| | | | | |
|---|---|---|---|---|
| FR | | 2889168 A1 * | 2/2007 | ............. B65D 41/34 |
| FR | | 2889168 A1 | 2/2007 | |
| JP | | 2008-052926 | 3/2008 | |
| JP | | 2008236196 A | * 10/2008 | |

OTHER PUBLICATIONS

European Patent Application No. 13741484.3; Extended Search Report; dated Jul. 9, 2015; 7 pages.

International Search Report dated Jun. 24, 2013, issued in International Patent Application PCT/US2013/022117.

* cited by examiner

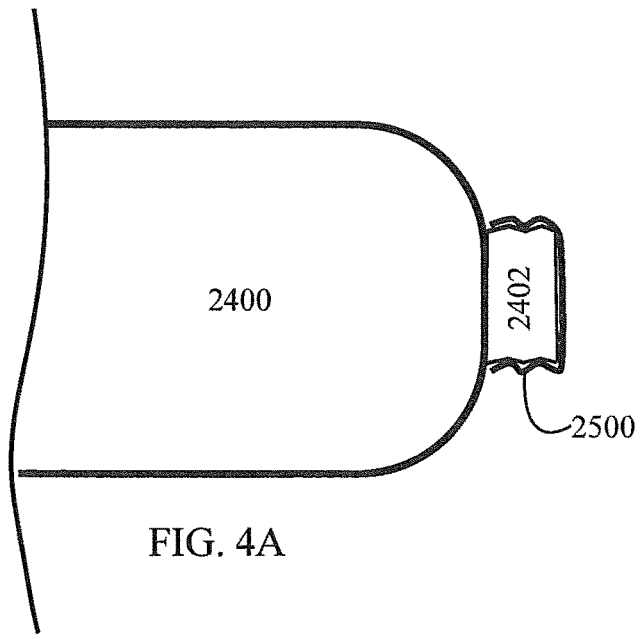
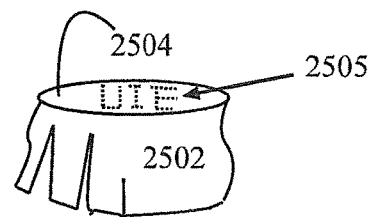
FIG. 4A    FIG. 4B
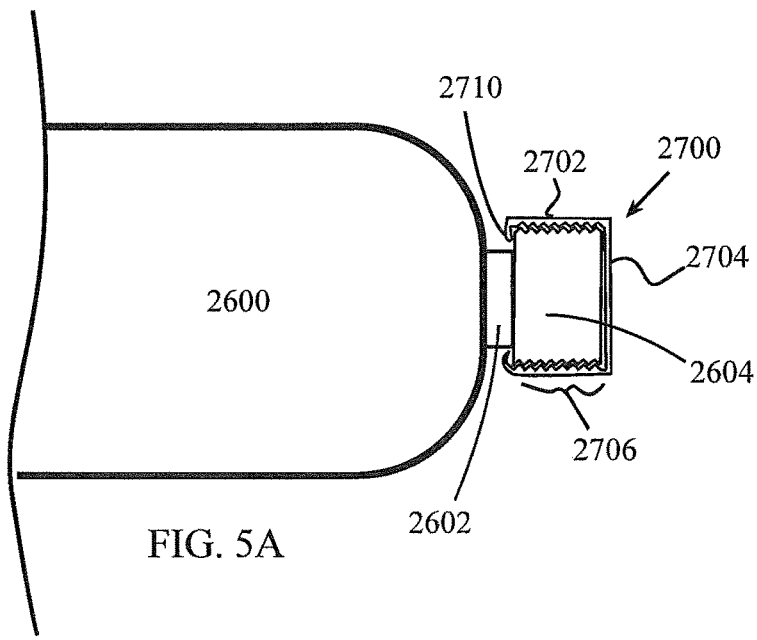
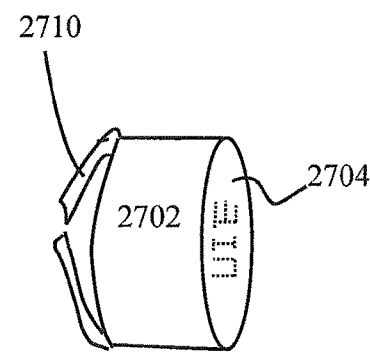
FIG. 5A    FIG. 5B

AUTHENTICATION OF REPLACEABLE FUEL CARTRIDGE

RELATED APPLICATION

The present application is a U.S. National Stage of International Application No. PCT/US2013/022117, filed Jan. 18, 2013, which claims the benefit of and priority to U.S. Provisional Application No. 61/590,688, filed Jan. 25, 2012, the entire disclosures of each of which are incorporated herein by reference in their entireties.

BACKGROUND

1. Field

This disclosure relates to fuel cell power systems, fuel cartridges to support such systems, and methods for authenticating fuel cartridges for use in fuel cell powered systems.

2. General Background

World-wide commercial use of fuel cell powered host devices, particularly portable devices. A non-exclusive list of potential host devices include, but are not limited to, computer peripherals, mobile phone peripherals, mobile phones, personal music players, laptops, notebooks, tablet, gaming devices, personal digital assistants (PDAs), and battery chargers. A fuel cell power system can either be located inside the host device or can be connected to the host device using suitable means. In either case, a means to provide fuel to the power system is required. An example of one such means is the use of fuels packaged in cartridges (packaged fuel) in predetermined amounts to satisfy the volume, weight and run time requirements of the host device, use profile of the host device, and regulatory requirements associated with the host device. For the sake of simplicity, a fuel cell power system is considered to comprise of a fuel cell subsystem that includes the fuel cell or a multiplicity of fuel cells in the form of a fuel cell stack, fluid, and power management means, a process controller, and the fuel cartridge. The fuel cartridge is connected to the fuel cell subsystem system using a connector or coupling.

To support commercialization, low-cost, user-friendly, methods for authentication, and methods for monitoring the status and health of the fuel cell power system, and logistics associated with supply and disposing of fuel cartridges are needed. At the other end of the spectrum of low-cost are cartridges such as those disclosed in U.S. Pat. Nos. 7,655,331, 7,401,712, 7,306,863, 6,828,049 and 7,914,945 which may require memory components and other identification tags to enable this bi-directional communication. One may expect higher unit costs for such devices, and part of the costs in recycling of spent cartridges may include expensive components to be harvested.

Accordingly it is a desideratum to have an alternative to "smart" cartridges. to enable user-friendly and low-cost fuel cartridges and fuel cell power systems, and methods that enable authentication of fuel cartridges for use in fuel cell power systems.

DESCRIPTION

According to some exemplary implementations of the disclosure a method, system and device for authenticating replaceable hydrogen cartridges. In some aspects in a host system utilizing at least a fuel cell to generate electricity.

According to some exemplary implementations a method of challenging, reducing, addressing and/or deterring tampering with a hydrogen fueled host is disclosed. Said host being a device that contains at least a fuel cell stack, such as a Proton Exchange Membrane or PEM stack, powered by a hydrogen fuel. Utilization of hydrogen of a lesser purity than nominal for a fuel cell in a host device can lead to damage to the proton exchange membrane in a fuel cell and reduced longevity and/or efficiency of the device. Authentication in some instance is a process which allows the user of a replaceable fuel container to assess if the replacement container contains hydrogen fuel from a trustworthy source.

According to some exemplary implementations a method of challenging, reducing, addressing and/or deterring tampering with a hydrogen fueled host is disclosed. Said host being a device that contains at least a fuel cell stack, such as a Proton Exchange Membrane or PEM stack, powered by a hydrogen fuel. Utilization of hydrogen of a lesser purity than nominal for a fuel cell in a host device can lead to damage to the proton exchange membrane in a fuel cell and reduced longevity and/or efficiency of the device. Authentication in some instance is a process which allows the user of a replaceable fuel container to assess if the replacement container contains hydrogen fuel from a trustworthy source. Authentication in some instances allows a user to consider or check if the fuel container has been tampered with or may be a counterfeit. In some instances the authentication may also include a conforming fit of a canister or container to a carriage.

According to some exemplary implementations of the disclosure is a method, system and device for verifying authenticity of a replaceable hydrogen canister's authenticity for use in a host system utilizing at least a fuel cell to generate electricity including at least one unique identifier element (UIE) associated with a fuel canister used to verify the canister.

In some exemplary implementations of the disclosure, the UIE is covered until a user lifts a tape or breaks a frangible cover or layer. In some instance the frangible layer is a film over the UIE.

In some exemplary implementation of the disclosure, a removable membrane such as foil, tape, plastic, paper, foam, seal, or the like is affixed over the dispensing end of the canister of fuel.

In some exemplary implementation of the disclosure, a removable cover (i.e. a seal, closure or cap) is fixed over the dispensing end of the canister. In some instances a UIE is formed on the inner surface of the cover whereby said UIE can only be seen when the cover is removed. In some instance the cover is fixed with frangible portions whereby removal of the cover requires breaking at least one frangible portion.

In some exemplary implementations of the disclosure, the canister or the dispensing end has a pre-selected threading pattern which mates with a host device.

In some exemplary implementations of the disclosure is a canister body that has one or more indentations or guide holes wherein a catch on the host holds or pressure fits the cartridge in place. Said guide or indentation may cooperate as a part of a latch and catch system with a carriage or a host device.

In some exemplary implementations of the disclosure is a container having at least one of the cartridge body and dispensing end with a selected latch shape such as a rail or channel formed thereon, or an overall body shape which will only mate with a corresponding catch shape on a carriage or host wherein the container mates.

In some exemplary implementations of the disclosure, the canister or the dispensing end have a selected non-circular latch shape which fits into a catch on the host that matches the catch shape.

In some exemplary implementations of the disclosure, a visual inspection of the UIE is performed to verify source of goods via logo, brand or other unique feature.

In some exemplary implementations of the disclosure a UIE on a container is suitable for scanning. Said UIE may be a glyph, bar code or the like. In this system and method of verification, a seller of the cartridge, such as a retail location, upon receipt of the cartridge compares the UIE on each cartridge to a packing list of UIEs. In some instances, the retailer scans a bar code or the like, and the UIE is matched with a database. Non-matching UIE's are called out to the retail store as unverified.

In some exemplary implementations of the disclosure, a method of deterring tampering with a hydrogen powered host device is provided via a cartridge and carriage configuration that limits connection of a hydrogen source. The method includes placing a hydrogen cartridge in a carriage having a fluid communication means; said cartridge having a hollow body; said cartridge having a shaped dispensing end; said carriage having a fluid communication means that matches said shaped dispensing end; whereby to deter use of counterfeit or not approved hydrogen purity only a cartridge with specific shaped dispensing end mates to said fluid communication means. In some instances, verification by the user of a UIE is used in conjunction with a conforming mate between cartridge and carriage to deter tampering with the fuel source for a host device.

The above-mentioned features and objects of the present disclosure will become more apparent with reference to the following description taken in conjunction with the accompanying drawings wherein like reference numerals denote like elements and in which:

DRAWINGS

FIG. 4A is a partial cut-away side view of a hydrogen tank.

FIG. 4B is a view of the cap of FIG. 4A.

FIG. 5A is a partial cut-away side view of an implementation of a hydrogen tank.

FIG. 5B is a view of the cap of FIG. 5A.

Figure 1A:
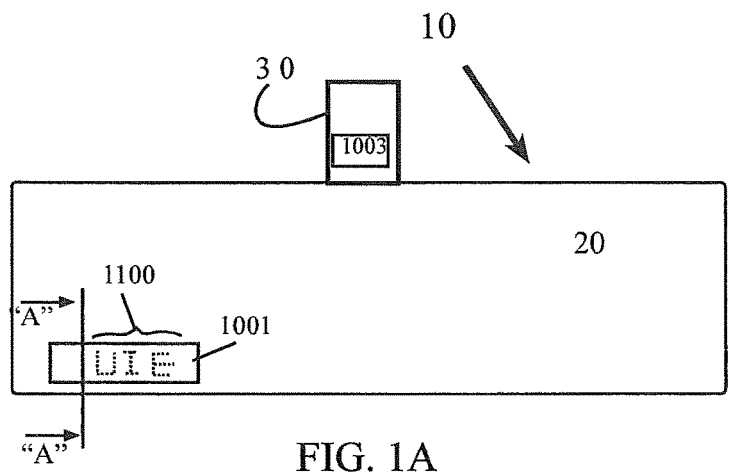
FIG. 1A is a side view of an implementation of a hydrogen canister

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel.

FURTHER DESCRIPTION

PEM fuel cells require hydrogen fuel to generate electricity. Hydrogen can be stored as-is or can be produced on demand. In certain applications, it is useful to have replaceable hydrogen supplies which may be supplied as pressurized gas in tanks (also known as a container, outer shell, tank, canister or cartridge) or hydrogen stored in metal hydrides, in slurries or in other substrates. Hydrogen may also be supplied in the form of a precursor chemical in the form of a chemical hydride. The latter is particularly suited for portable power system whereby the chemical stored in the tank is reacted using suitable methods, as needed, to produce hydrogen on-demand.

High purity hydrogen is preferred when used in a PEM fuel cell. Purity above 99% is preferred. Hydrogen above about 99.9% purity is more preferred and hydrogen above about 99.99% purity is most preferred. Assuring proper purity of hydrogen is important, as impurities in a hydrogen fuel supply may damage or degrade the performance of the PEM fuel cell. Deterring the use of an unauthorized or unauthenticated hydrogen fuel source is one means of insuring that the end user can rely on the stable and production of power from a PEM fuel cell system. This also enables monitoring and disposal of counterfeit hydrogen supplies.

Figure 1B:
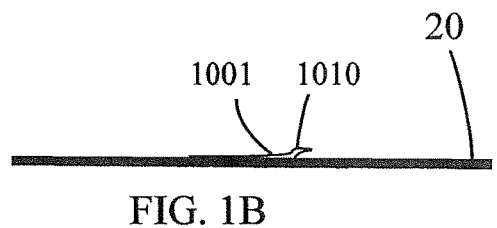
FIG. 1B is a sectional view along line "A"-"A" of FIG. 1A.

Shown in FIGS. 1A and 1B is a hydrogen tank fuel supply 10 comprising a body 20 which is a generally hollow element impermeable to hydrogen leakage at a preselected pressure. A hollow element may include an outer shell. Tank 10 refers to both a tank that stores hydrogen as-is or in a chemical hydride or other precursor form. Said tank may be lined or unlined. Said tank has at least one dispensing end 30 which is fitted with a fluid communication means such as a valve, membrane, frangible barrier and the like.

Affixed to said tank fuel supply is a unique identifier element "UIE1." UIE 1000 beneath on the underside surface of removable strip 1100. The UIE is generally one or more of a code, colors, bar code, numbers, letters, holograms, character, two dimensional (2D) bar code, QR Code (generally described in (ISO/IEC 18004:2000(E)) glyph, image, icon picture, organic chemical, three dimensional (3D) mechanical feature, mechanical strip or matrix, inorganic chemical, doped substrate, natural substrate, manufactured substrate and the like. Chemicals and substrates may form a base layer of label or tape, and are a support for a UIE, or, such chemicals and substrates may be a UIE.

Said strip may be a laminate, metal-like, Mylar, plastic, wax, paper, film, paint, peel off, scratch off, frangible, tape or the like. In some instances, said strip will have a grab tab 1010 whereby a user can uncover said UIE by removing, pulling, or destroying the strip. It is preferred that the removal of said strip damages or destroys said strip or the ability to reattach the strip.

Figure 2:
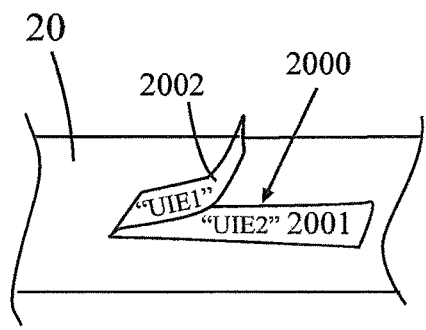
FIG. 2 is a perspective view of an UIE on a hydrogen canister.

Shown in FIG. 2 is a dual UIE configuration 2000. A first unique identifier element "UIE1" is affixed as part of a removable strip 2001 and covers a second unique identifier element "UIE2" 2002, whereby UIE1 and UIE2 may be viewed independently or in combination, to establish authenticity based on combinations supplied to, or known by, at least one of a secure database, a secure look-up table, the seller and user. Correlation of unique identifiers to each other via a database or look up table may be performed visually, by machine, or by a third party. In some instances, UIE1 maybe be formed on the underside of the strip 2001, whereby it can only be viewed after strip 2001 is lifted.

For UIE's to correlate it may include being sequenced, being matching, being color coded, coded, or being correlated in a look-up table or database.

Figure 3:
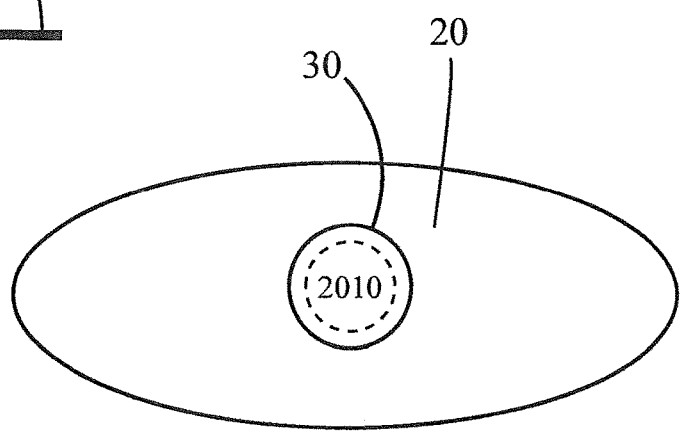
FIG. 3 is a front view of an implementation of a hydrogen cartridge.

FIG. 3 illustrates a front view of a hydrogen tank fuel supply 10 dispensing end 30 extending from body 20. Affixed to and covering dispensing end 30 is a membrane 2010. The membrane may be constructed of any material which is removably fixable to the dispensing end, using materials including but not limited to papers, foam, foil, Mylar, plastic, laminates, rubber, or a combination thereof. The membrane is marked with a UIE, and the UIE may be on one or more of the external side of the membrane and the internal side of the membrane. The membrane is affixed in a fashion to assure a standard visual appearance.

FIGS. 4A-4B illustrate a hydrogen cartridge 2400 with a dispensing end 2402 covered by a cap 2500. The cap 2500 fits over the dispensing end 2402. The dispensing end may be threaded, ribbed, divoted, with bumps or wells and the like, shaped or smooth. In some instances, the cap 2500 maybe a plastic or vinyl coating, formed over the dispensing end 2402, whereby it can only be removed by destruction of some portion of the cap. The cap has an annular wall 2502 and a top 2504. In some instances, a UIE 2505 is formed on at least one of the outside and the internal side of the cap 2500. In some instances, the cap 2500 is shrink-fitted over the dispensing end, whereby it can only be removed by destruction or breakage of at least one of the annular wall 2502 and the top 2504.

Those of ordinary skill in the art will recognize that in addition to a shrink-fit over the dispensing end, a cap may be sonically welded, glued, or friction fitted. Additionally, malleable or fluid-like material may be used to form the cap and bind over the dispensing end by drying into a shape that conforms to said end, all of which are within the scope of this disclosure.

FIGS. 5A-5B illustrate a hydrogen cartridge 2600 with a dispensing end 2602, said dispensing end 2602 having an enlarged head 2604 which mates to a cap 2700. The cap 2700 fits over at least the enlarged head end 2604. The enlarged head end may be threaded, ribbed, divoted, with bumps or wells and the like, shaped or smooth. The cap has an annular wall 2702, and a top 2704. The inside of the annular wall may be smooth and flat, or it may be shaped to conform to or fit onto any surface features of the enlarged head. A frangible ring 2710 is formed at the bottom of the annular wall. Removal of said cap can only be achieved by breaking said frangible ring. In some instances, a UIE is formed on at least one of the outside and the internal side of the cap 2700.

Those of ordinary skill in the art will recognize that in addition to a shrink-fit over the dispensing end, a cap may be sonically welded, glued, or friction fitted. Additionally, malleable or fluid-like material may be used to form the cap and bind over the dispensing end by drying into a shape that conforms to said end, all of which are within the scope of this disclosure.

Figure 6A:
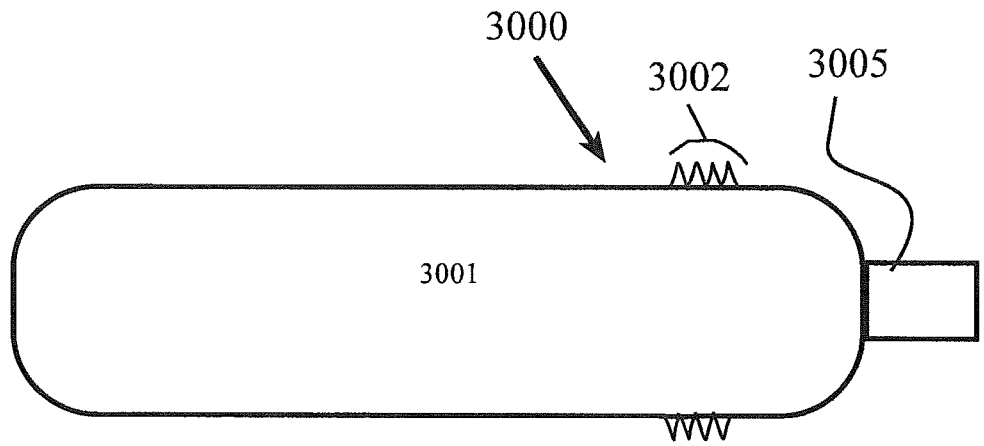
FIGS. 6A-6B show an implementation of a hydrogen tank with preselected threading.
Figure 6B:
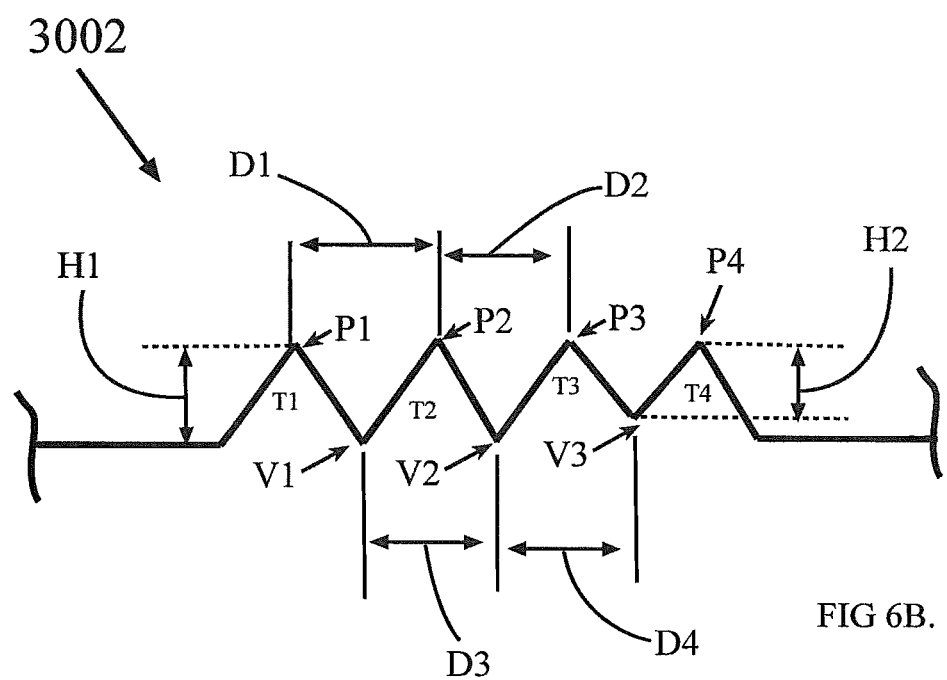

In FIGS. 6A and 6B a hydrogen dispensing tank 3000 with a hollow body 3001 is shown with external threading 3002. A dispensing end 3005 is attached to said hollow body, whereby with appropriate valve's hydrogen stored therein may be utilized as fuel.

The parameters of a thread may be defined by many aspects. In FIG. 6B, a series of threads T1-T4 have peaks designated P1-P4 which are separated by a series of valleys designated V1-V3. A distance "D1" is the gap between peak P3 and peak P4. A distance "D2" is the gap between peak P1 and peak P2. A distance "D3" is the spacing between valley V1 and valley V2. A distance "D4" is the spacing between valley V3 and valley V4. Additionally, height from outer shell also referred to as a hollow body 3001 to the top of peak P1 is designated "H1," whereas the height from the bottom of valley V3 to the top of peak P4 is designated "H2". As shown in FIG. 6B, H1 does not equal H2.

With the aforementioned parameters the gap or spacing or height between peaks and valleys, or from hollow body to threads, can be preselected to provide a unique thread which only mates with a corresponding mount.

Figure 7:
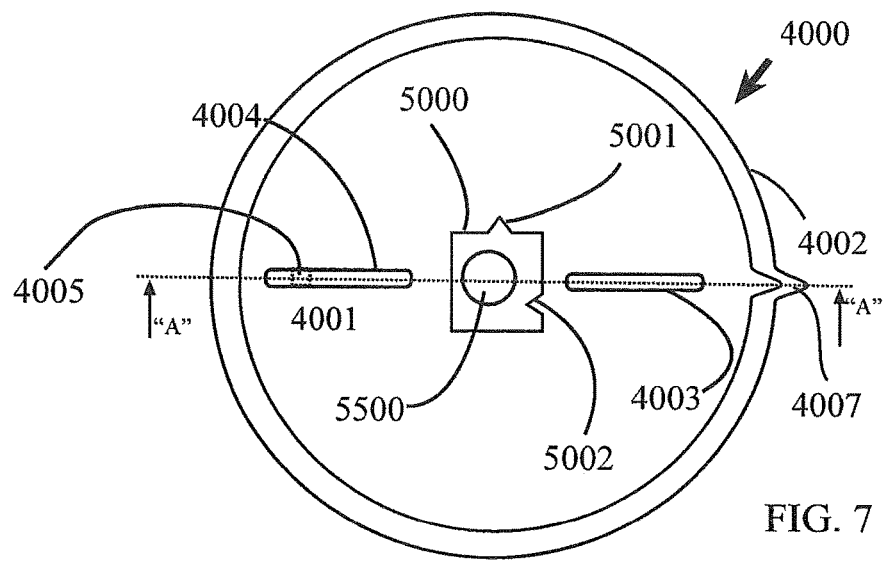
FIG. 7 shows an implementation of a cartridge and dispensing end.

FIG. 7 provides a bottom view showing some aspects of an exemplary implementation of a hydrogen cartridge 4000. The cartridge is shown with shaped body portions. A first body portion 4001 is contiguous with a second body portion 4002. A generally linear well 4003 is an indentation in the body. A generally linear rail 4004 is extended from said body. Attributes such as a catch, divot, or pass through hole 4005 may be formed in said body or rail. The pass through hole 4005 may be utilized to secure said cartridge with a latch (not shown). Such a latch is preferably part of a carriage or host device into which said cartridge is utilized as a fuel source. A properly mounted cartridge or tank may be steadied or removably held in place by such a latch and catch. Those of ordinary skill in the art will recognize that shaped portions of the body may include curves, gaps, bends, tapers, radii, wells, rails, ribs, steps and the like. Additional cartridge shape that may be conformational for seating or fitting said cartridge into a host or carriage may include one or more extended side ribs 4007.

A dispensing end 5000 is affixed to the body. The dispensing end is shown square with a rib 5001 and a well 5002. Those of ordinary skill recognize that the dispensing end could be a cylinder or other shape (i.e. arched, flat, conical, complex curved, or geometric). A shaped dispensing end can act as a deterrent to utilizing an unknown fuel source in device that is powered by hydrogen via a fuel cell. A dispensing region 5500 is formed in the dispending end. The dispensing region maybe a frangible section of the dispensing end, a membrane covering a fluid pathway, and/or a valve or regulator communicating with a fluid pathway into the cartridge body.

Figure 8:
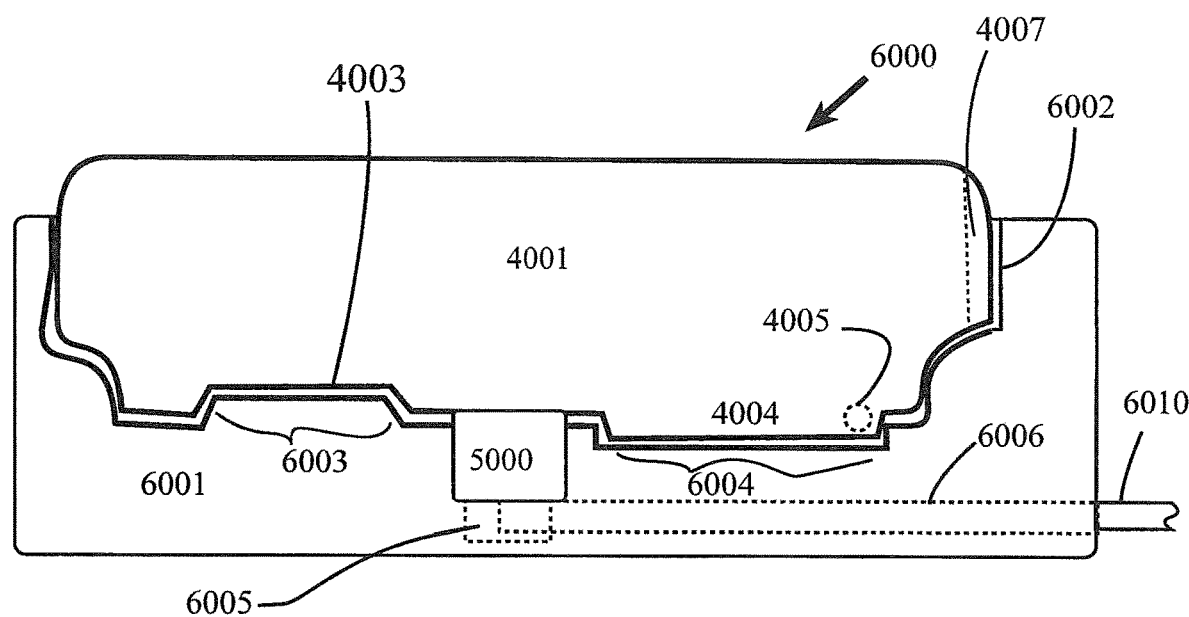
FIG. 8 shows an implementation of a hydrogen cartridge and dispensing end mounted in a host.

FIG. 8 illustrates a cutaway side view of a hydrogen mounting system 6000. The hydrogen cartridge of FIG. 7 is illustrated mounted to a carriage 6001. Said carriage could also be a portion of a host device. A cartridge mount or guide 6002 formed in the carriage 6001 is shaped to mate with the exterior contour and shape of the cartridge 4000. A well catch 6003 is shown extending into the linear well 4003 of the cartridge and a rail catch 6004 is shown accepting entry of the linear rail 4004, whereby hydrogen fuel passes from said dispensing end to a fluid pathway 6006 to a fuel feed 6010. Said pathway 6006 and said fuel feed 6010 maybe the same element.

Figure 9A:
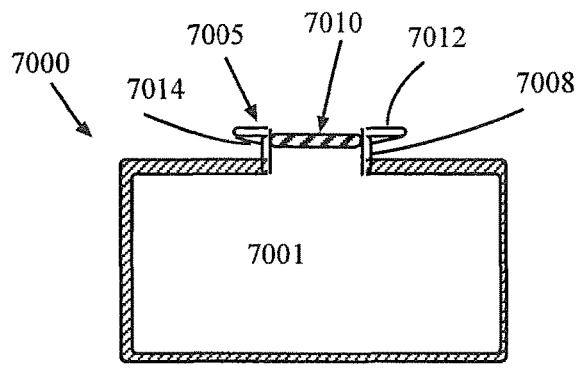
FIGS. 9A and 9B show a cut away side and a dispensing end view of a hydrogen cartridge.
Figure 9B:
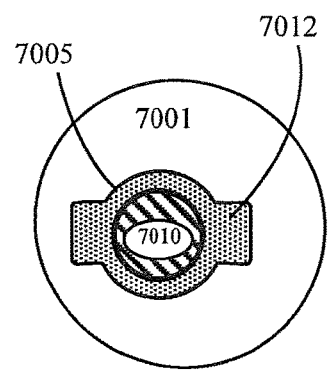

In some instances, the dispensing end 5000 and/or dispensing region 5050 is shaped wherein it may only mount into the fluid communication means in a preselected shape. In some instances, both the body and dispensing end or dispensing region are shaped to limit mating of a cartridge with a carriage to a preselected configuration, FIGS. 9A-B show another exemplary implementation of a hydrogen canister mounting system and device. The canister 7000 has a body 7001 containing hydrogen, a dispensing end 7005 and a neck 7008 which supports the dispensing end 7005. To dispensing hydrogen from said canister a fluid communication means 7010 through said dispensing end is provided. The dispensing end further comprises flanges 7012 which are non-circular and extend outward from a portion of said dispensing end. Said flanges may also include an angled bottom surface 7014 (the side below the top) below the flanges. The angled topography is ramp-like, wherein twisting said arms into a cooperative substantially flat latch will urge the fluid communication means 7010 into a predetermined position.

Figure 10:
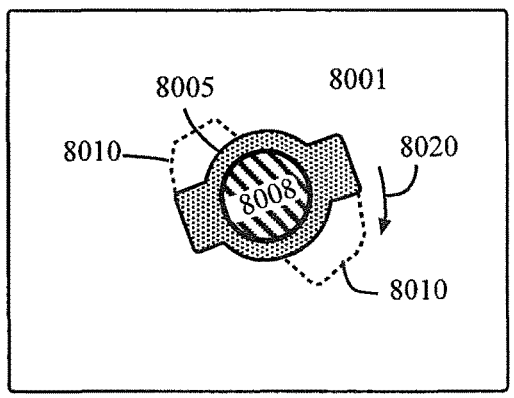
FIG. 10 shows a mounting end view of a host unit which accepts a hydrogen cartridge.
Figure 11:
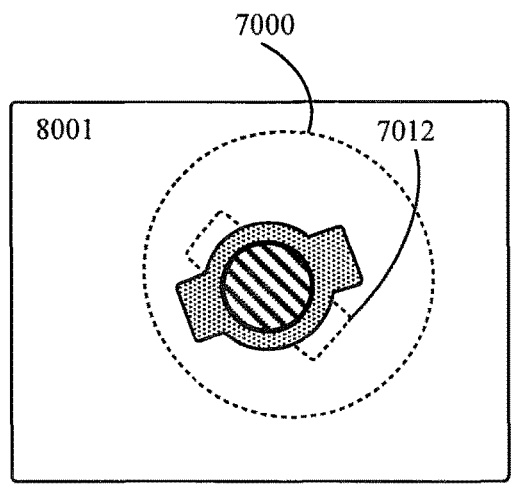
FIG. 11 show a composite view of the cartridge of FIGS. 9A and 9B mounted into the host of FIG. 10.

Illustrated in FIGS. 10 and 11 is a host system 8000 which may also be a carriage used in conjunction with a larger system having a body 8001 with a fuel receptacle guide 8005 and a host fluid communication means 8008. The shape and size of the fuel receptacle guide 8005 is such that it will mate with the dispensing end 7005 of a canister.

FIG. 11 shows an overlay view of a canister 7000 mated into a host with flanges 7012 rotated below undercuts, thereby holding the cartridge's dispensing end 7005 in place for fluid communication.

The fuel receptacle guide 8005 having undercuts 8010 whereby said flanges 7012 upon rotation therein are held in place via undercuts 8010. The undercuts have a thickness from the exterior of the host to the interior surface or wall (not shown) of an undercut. That thickness may be preselected to require a user to press the cartridge into the receptacle guide 8005 with sufficient pressure to move the fluid communication means 7010 to engage with a seal and/or valve to provide for fluid communication of hydrogen if the user or the system controller of the host opens the required valves for such communication.

In some instances, when flanges have angled bottom surface 7014 the fluid communication means of the canister 7010 may be brought into a desired position in reference to the host fluid communication means 8008 or "host fcm" via the angled bottom surface acting as a ramp against the undercut interior surface. Those of ordinary skill in the art will recognize that the angled bottom surface 7014 can be swapped over to the undercuts 8010 wherein the twisting of a canister having flat flanges may still be positioned via the urging of the fluid communication means via angled undercuts.

Yet further, the aforedescribed mating features working cooperatively whereby the flanges 7012 are inserted into the undercuts 8010 and one is then rotated; the undercut 8010 accepts the flange 7012 and secures the canister in place. The undercut and flange preferably have an interference fit via surface roughness, gasket or the like such that the force required to rotate the two components passes through a peak point, hence a significant force is required to engage and disengage the canister.

In some instances, to provide a predetermined method of disassociation on impact, dropping, or other failure, the undercut 8010 may have crumple zones or weakened areas, wherein if a device comprising an assembly of a cartridge and a host (or carriage) is impacted, the weaken region in the undercut will fail, causing the cartridge to disassociate. In other instances, the flanges on a cartridge which are held by an undercut may have a breakaway feature, wherein upon trauma to the device the cartridge will disassociate. Those of ordinary skill in the art will recognize that in concert with a separation of cartridge from mounting in a device or carriage, the dispensing end of the cartridge will shut the fluid communications of hydrogen flow.

Figure 12:
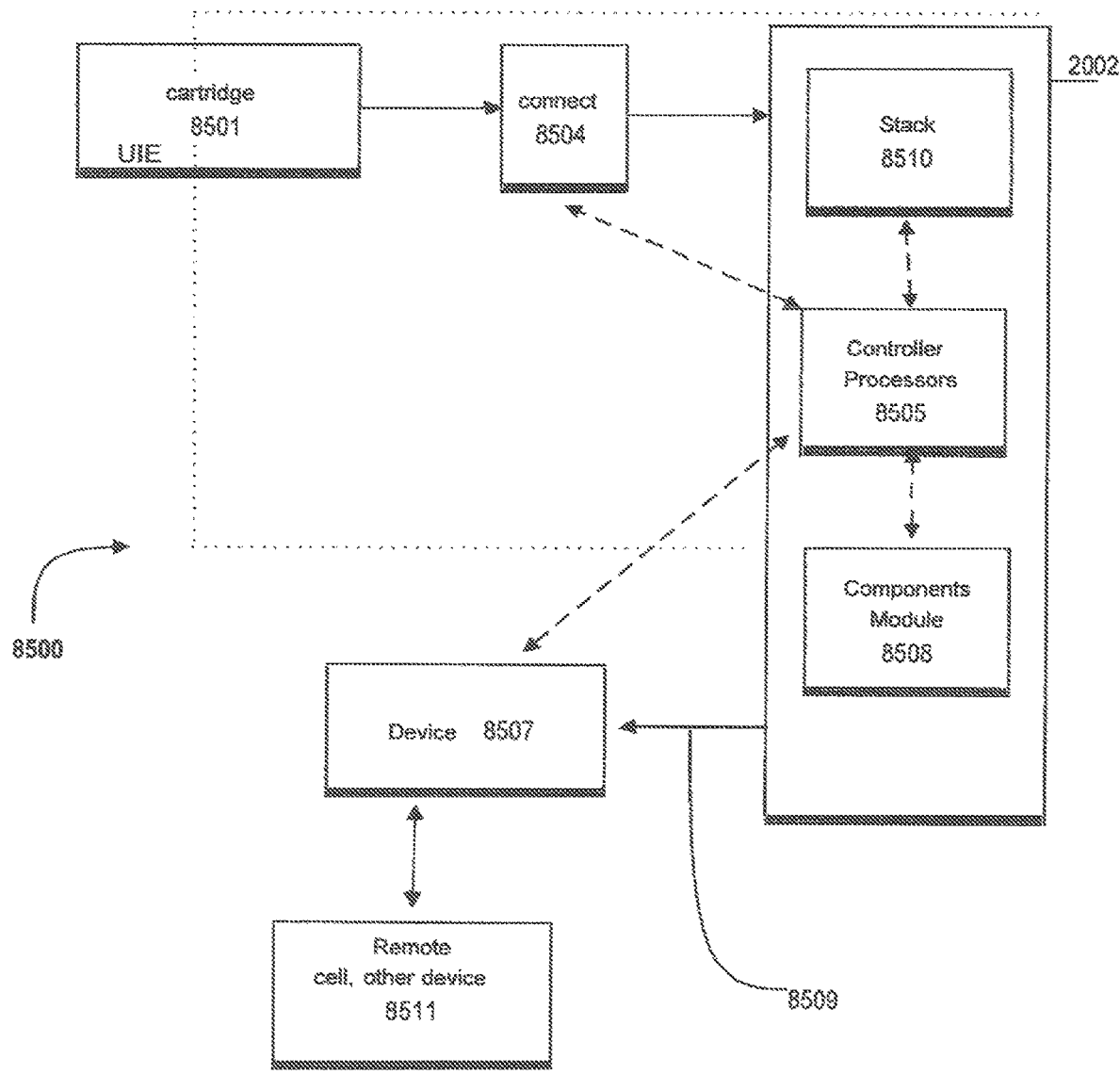
FIG. 12 is a partial schematic of major components of a host system utilizing replaceable hydrogen cartridges to supply a fuel cell and provide electrical power.

FIG. 12 shows an overview of some major components of a schematic of a authentication system which may reduce or deter use of non-authentic fuel sources. The system 8500 utilizes replaceable hydrogen fuel supply canisters 8501 with a host 8502. A canister 8501 having a cartridge filled with hydrogen and having a pressure relief valve is connected via a fluid communication means to a gas delivery 8504 component also known as a host fluid communication means. a controller 8505 can be used to control the flow of hydrogen from the canister to the host via the host fluid communication means. Said controller may also be used to communicate with any attached electronic device 8507 utilizing power from said system. Said controller may also interact with processor and logic in the electronics module 8508 regarding optimizing parameters of the system. Electricity is supplied 8509 to the device. Wherein at least one of said controller and electronics adjust the consumption of hydrogen at the fuel cell 8510. A remote communications device such as a cell phone or smart tablet or the like 8511 can interact with the device 8507 and/or the host.

While the method and devices have been described in terms of what are presently considered to be the most practical, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure also includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the invention both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element, disclosed, should be understood to encompass a disclosure of the action which that physical element facilitates.

Any patents, publications, or other references, mentioned in this application, for patent, are hereby incorporated by reference. In addition, as to each term used, it should be understood that, unless its utilization in this application is inconsistent with such interpretation, common dictionary definitions should be understood, as incorporated, for each term, and all definitions, alternative terms, and synonyms such as contained in at least one of a standard technical dictionary recognized by artisans and the Random House Webster's Unabridged Dictionary, latest edition, are hereby incorporated by reference.

Finally, all references, listed in the Information Disclosure Statement or other information statement filed with the application, are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard, it should be understood that, for practical reasons, and so as to avoid adding potentially hundreds of claims, the applicant has presented claims with initial dependencies only.

Support should be understood to exist, to the degree required under new matter laws, —including but not limited to United States Patent Law 35 USC 132 or other such laws, —to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A method of authenticating a hydrogen fuel canister, the method comprising:

providing a frangible tape bearing a first unique identifier (UIE) suitable for scanning;

providing a shaped hydrogen fuel canister storing pressurized gas, wherein a dispensing end of the shaped hydrogen fuel canister is configured to be placed in a carriage having a fluid communication means, wherein the shaped hydrogen fuel canister has a hollow body with shaped portions, wherein the shaped portions are configured to mate with a surface of the carriage by connecting said dispensing end with said fluid communication means, and wherein the shaped hydrogen fuel canister includes a second UIE suitable for scanning, wherein the frangible tape is affixed to the shaped hydrogen fuel canister;

providing a frangible cap, wherein the frangible cap is secured over the dispensing end of the fuel canister, whereby said frangible cap can only be removed via breaking it;

scanning said first UIE and said second UIE to a tablet or smart phone machine including a processor;

determining, using the machine including the processor, that said first UIE and said second UIE are authentic at least in part by comparing the first UIE in combination with the second UIE to an electronic database of authentic UIEs;

communicating to a controller with processor and logic in an electronics module via an attached electronic device that optimizes parameters of a system performing at least a portion of the method and verifies that the first UIE and the second UIE match an entry in the electronic database of authentic UIEs; and opening, using the controller and based on the match, a valve operatively coupled with the carriage, wherein the valve when open provides fluid communication with the shaped hydrogen fuel canister.

2. The method of claim 1, wherein the frangible cap is marked with another UIE is inside of said cap, and wherein the other UIE can only be viewed when said frangible cap is removed.

3. The method of claim 1, further comprising:
determining that the first UIE and the second UIE correlate.

4. The method of claim 3 wherein correlation comprises at least checking a look up table (LUT) to confirm a relationship of the first UIE to the second UIE.

5. The method of claim 1, wherein the second UIE is placed under the frangible tape, and wherein and said second UIE can only be viewed if said frangible tape or label is broken.

6. The method of claim 1, wherein the frangible tape is placed over the dispensing end of said fuel canister.

7. The method of claim 6, the method further comprising placing a second UIE under the frangible tape on the body of said fuel canister.

* * * * *